(12) United States Patent
Abraham et al.

(10) Patent No.: US 8,681,043 B2
(45) Date of Patent: *Mar. 25, 2014

(54) METHOD AND SYSTEM FOR SHARING AN OSCILLATOR FOR PROCESSING CELLULAR RADIO SIGNALS AND GNSS RADIO DATA SIGNALS BY DEFERRING AFC

(75) Inventors: Charles Abraham, San Jose, CA (US); John Walley, Ladera Ranch, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,333

(22) Filed: Feb. 6, 2012

(65) Prior Publication Data
US 2012/0223858 A1 Sep. 6, 2012

Related U.S. Application Data

(63) Continuation of application No. 12/651,056, filed on Dec. 31, 2009, now Pat. No. 8,111,189.

(51) Int. Cl.
*G01S 19/23* (2010.01)

(52) U.S. Cl.
USPC .................................................. 342/357.62

(58) Field of Classification Search
USPC ........................................ 342/357.62, 357.76
IPC .................................. G01S 19/23,19/235, 19/36
See application file for complete search history.

(56) References Cited

U.S. PATENT DOCUMENTS

| 6,002,363 | A | * | 12/1999 | Krasner | 342/357.77 |
| 8,111,189 | B2 | * | 2/2012 | Abraham et al. | 342/357.62 |
| 2003/0197638 | A1 | * | 10/2003 | Bloebaum et al. | 342/357.06 |
| 2006/0033658 | A1 | | 2/2006 | Camp | |
| 2007/0241956 | A1 | | 10/2007 | Jin | |
| 2008/0048788 | A1 | * | 2/2008 | Yu | 331/16 |
| 2008/0157884 | A1 | * | 7/2008 | Lee | 331/44 |
| 2009/0231188 | A1 | * | 9/2009 | Yanni et al. | 342/357.06 |

\* cited by examiner

*Primary Examiner* — Jack W Keith
*Assistant Examiner* — Fred H Mull
(74) *Attorney, Agent, or Firm* — Sterne, Kessler, Goldstein & Fox P.L.L.C.

(57) ABSTRACT

A global navigation satellite system (GNSS) enabled mobile device comprising a crystal oscillator and an automatic frequency correction (AFC) circuit may be operable to share the crystal oscillator between processing of cellular radio signals and processing of GNSS data messages. The GNSS enabled mobile device may be operable to enforce an AFC correction when the crystal oscillator drifts beyond a specific frequency error. The AFC correction may be allowed during time intervals corresponding to GNSS words at which decoding of these words is not required. The GNSS enabled mobile device may be operable to disable the AFC correction during time intervals associated with decoding of words while the crystal oscillator may drift within the specific frequency error range. After the decoding of one or more of words is completed, the AFC correction may be allowed during the time intervals corresponding to these words.

20 Claims, 4 Drawing Sheets

METHOD AND SYSTEM FOR SHARING AN OSCILLATOR FOR PROCESSING CELLULAR RADIO SIGNALS AND GNSS RADIO DATA SIGNALS BY DEFERRING AFC

CROSS-REFERENCE TO RELATED APPLICATIONS/INCORPORATION BY REFERENCE

This patent application is a Continuation of U.S. patent application Ser. No. 12/651,056, filed Dec. 31, 2009, now U.S. Pat. No. 8,111,189.

FIELD OF THE INVENTION

Certain embodiments of the invention relate to communication systems. More specifically, certain embodiments of the invention relate to a method and system for sharing an oscillator for processing cellular radio signals and GNSS radio data signals by deferring AFC corrections.

BACKGROUND OF THE INVENTION

The global positioning system (GPS), the global orbiting navigation satellite system (GLONASS), and the satellite navigation system GALILEO are examples of global navigation satellite systems (GNSS). A GNSS utilizes an earth-orbiting constellation of a plurality of satellites each broadcasting GNSS signals which indicates its precise location and ranging information. From particular locations on or near the earth, GNSS receivers may detect valid GNSS signals using a temperature compensated crystal oscillator (TCXO) and take various GNSS measurements such as pseudorange, carrier phase, and/or Doppler to calculate navigation information such as GNSS receiver positions, velocity, and time.

The GNSS receivers may be integrated within or externally coupled to mobile devices for exemplary navigation applications comprising E911, location-based 411, location-based messaging. The mobile devices may provide connections to access applications such as route tracking, multimedia communication, song downloading, instant messaging, making phone call, and/or mobile television (TV).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for sharing an oscillator for processing cellular radio signals and GNSS radio data signals by deferring AFC corrections, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for sharing an oscillator for processing cellular radio signals and GNSS radio data signals by deferring AFC corrections. In various embodiments of the invention, a global navigation satellite system (GNSS) enabled mobile device comprising a crystal oscillator and an automatic frequency correction (AFC) circuit may be operable to share the crystal oscillator between processing of cellular radio signals and processing of GNSS data messages. A plurality of time intervals within a time period corresponding to a frame of the GNSS data message for an AFC correction may be determined. The GNSS enabled mobile device may be operable to control the AFC correction based on the determined time intervals and a clock reference associated with the cellular radio signals. In this regard, the GNSS enabled mobile device may be operable to enforce the AFC correction in instances when the crystal oscillator drifts beyond a specific frequency error based on the clock reference.

A frame of the GNSS data message may comprise a plurality of subframes, and each of the subframes may comprise a plurality of words, and the plurality of words may comprise a telemetry word, a handover word and a plurality of data words. In this regard, the GNSS enabled mobile device may be operable to allow the AFC correction during the time intervals corresponding to one or more of the data words such as, for example, data words associated with almanac data at which decoding of these one or more of the data words is not required. The AFC correction may be disabled by the GNSS enabled mobile device during the time intervals associated with decoding of one or more of the words while the crystal oscillator may drift within a specific frequency error range based on the clock reference associated with the cellular radio signals. The GNSS enabled mobile device may be operable to allow the AFC correction during the time intervals corresponding to one or more of the words after the decoding of these one or more words are completed. In this regard, for example, after a GNSS time is decoded, the AFC correction may be allowed during the time intervals corresponding to the telemetry word and the handover word.

The GNSS data messages may be received from one of global positioning system (GPS) satellites or from one of global orbiting navigation satellite system (GLONASS) satellites.

Figure 1:
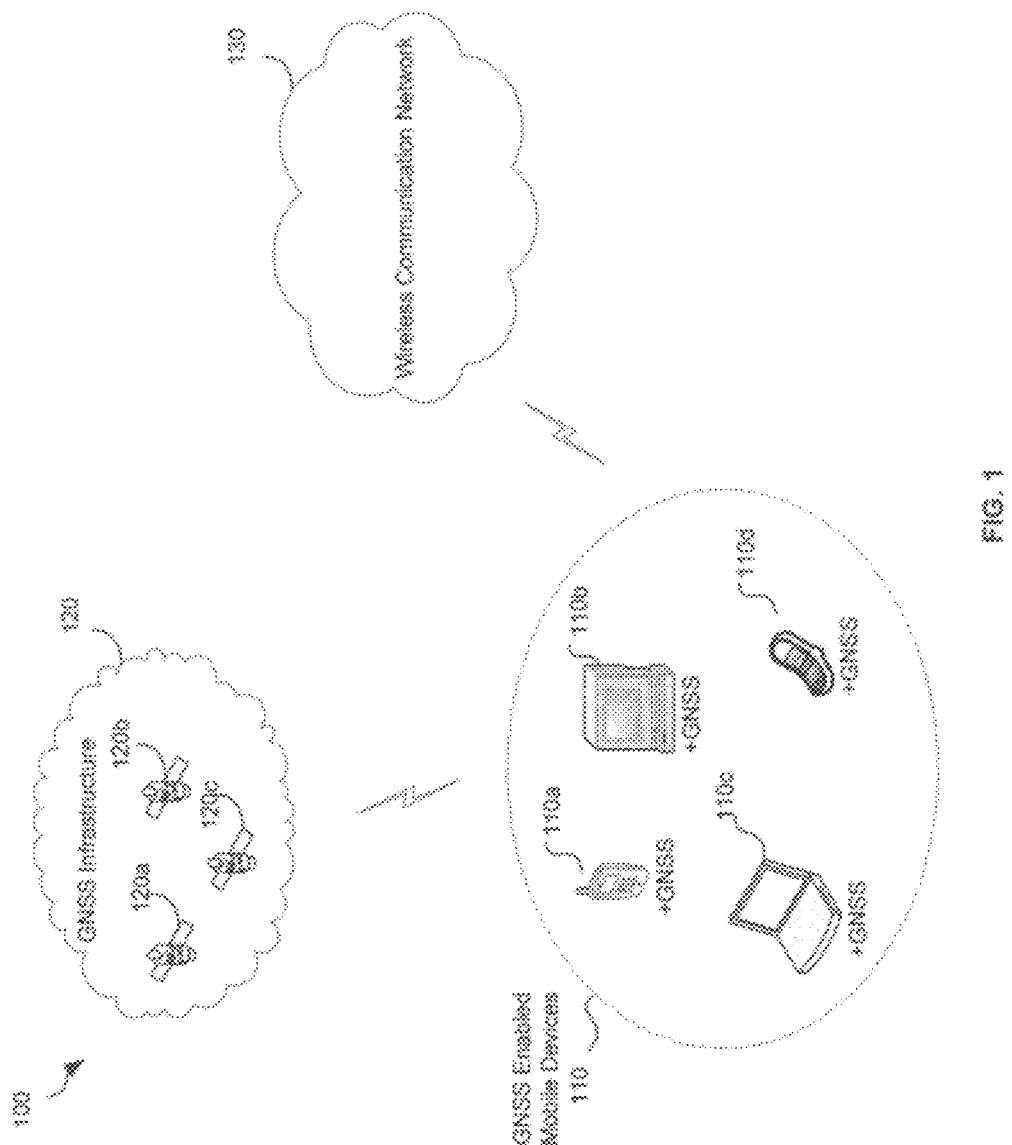
FIG. 1 is a block diagram illustrating an exemplary communication system that is operable to provide sharing of an oscillator when processing cellular radio signals and GNSS radio data signals by deferring AFC corrections, in accordance with an embodiment of the invention.

FIG. 1 is a block diagram illustrating an exemplary communication system that is operable to provide sharing of an oscillator when processing cellular radio signals and GNSS radio data signals by deferring AFC corrections, in accordance with an embodiment of the invention. Referring to FIG. 1, Referring to FIG. 1, there is shown a communication system 100. The communication system comprises a plurality of GNSS enabled mobile devices 110, of which GNSS enabled mobile devices 110a-110d are illustrated, a GNSS infrastructure 120, a wireless communication network 130. The GNSS infrastructure 120 comprises a plurality of GNSS satellites such as GNSS satellites 120a through 120c.

A GNSS enabled mobile device such as the GNSS enabled mobile device 110a may comprise suitable logic, circuitry, interfaces and/or code that are operable to communicate radio signals across the wireless communication network 130. The GNSS enabled mobile device 110a may be operable to receive GNSS broadcast signals or data messages from a plurality of visible GNSS satellites such as GNSS satellites 120a through 120c in the GNSS infrastructure 120. The received GNSS signals or data messages may be utilized to determine navigation information such as a position fix and/or a velocity of the GNSS enabled mobile device 110a. The determined navigation information such as a position fix of the GNSS enabled mobile device 110a may be communicated with, for example, the wireless communication network 130, for various navigation applications such as E911, location-based 411, location-based messaging, etc.

The GNSS enabled mobile device 110a may comprise a crystal oscillator whose frequency may be constantly adjusted to stay tuned to cellular base stations in the wireless communication network 130 using an automatic frequency correction (AFC). The GNSS enabled mobile device 110a may be operable to share the crystal oscillator between processing of cellular radio signals and processing of GNSS data messages. Due to a clock stability requirement for the decoding process of the GNSS data messages, the AFC correction may not be enabled or allowed during the decoding operation of the GNSS data messages such as, for example, during a coherent integration time interval. However, according to a clock reference specification associated with the cellular radio signals, in instances when the crystal oscillator drifts beyond a specific frequency error such as, for example, a hundred parts per billion of the clock signal received from a cellular base station due to, for example, temperature ramps or initial turn on, the AFC correction may not be deferred. In this regard, a plurality of time intervals within a time period corresponding to a frame of the GNSS data message for an AFC correction may be determined. The AFC correction may be controlled by the GNSS enabled mobile device 110a based on the determined time intervals and a clock reference associated with the cellular radio signals. The GNSS enabled mobile device. 110a may be operable to enforce or not to defer the AFC correction in instances when the crystal oscillator drifts beyond a specific frequency error based on the clock reference.

In an exemplary embodiment of the invention, a frame of the GNSS data message may comprise a plurality of subframes, and each of the subframes may comprise a plurality of words, and the plurality of words may comprise a telemetry word, a handover word and a plurality of data words. Each frame may take 30 seconds to transmit all the words. The telemetry word is used to synchronize with the subframes. The handover word which comprises timing information such as time-of-week (TOW) information is used to identify the subframes and to establish GNSS time. The GNSS enabled mobile device 110a may be operable to allow the AFC correction during the time intervals corresponding to one or more of the data words such as, for example, data words associated with almanac data at which decoding of these one or more of the data words is not required. The GNSS enabled mobile device 110a may be operable to disable or defer the AFC correction during the time intervals associated with decoding of one or more of the words while the crystal oscillator may drift within a specific frequency error range based on the clock reference. The GNSS enabled mobile device 110a may be operable to allow the AFC correction during the time intervals corresponding to one or more of the words after the decoding of these one or more words are completed. In this regard, for example, after a GNSS time is decoded, the AFC correction may be allowed during the time intervals corresponding to the telemetry word and the handover word.

The GNSS enabled mobile device 110a may receive the GNSS data messages from one of global positioning system (GPS) satellites or from one of global orbiting navigation satellite system (GLONASS) satellites.

A GNSS satellite such as the GNSS satellite 120a may comprise suitable logic, circuitry, interfaces and/or code that is operable to provide satellite navigational information to various GNSS receivers on earth. In an embodiment of the invention, the GNSS receivers, such as GPS, GALILEO or GLONASS receivers, may be integrated within GNSS capable mobile devices such as the GNSS enabled mobile devices 110a through 110d.

The wireless communication network 130 may comprise suitable logic, circuitry, interfaces and/or code that may be operable to provide voice and data services to various mobile devices such as the GNSS enabled mobile devices 110a-110d by using wireless or cellular communication technologies such as, for example, WCDMA, UMTS, HSDPA, CDMA, EV-DO, GSM, GPRS, EDGE, EGPRS, LTE, WiMAX, WiFi, and/or Bluetooth.

In operation, the GNSS enabled mobile device 110a comprising a crystal oscillator and an AFC circuit may be operable to share the crystal oscillator between processing, of cellular radio signals and processing of GNSS data messages. A plurality of time intervals within a time period corresponding to a frame of the GNSS data message for an AFC correction may be determined. The AFC correction may be controlled by the GNSS enabled mobile device 110a based on the determined time intervals and a clock reference associated with the cellular radio signals. The AFC correction may be enforced by the GNSS enabled mobile device 110a in instances when the crystal oscillator drifts beyond a specific frequency error based on the clock reference. The AFC correction may be allowed by the GNSS enabled mobile device 110a during time intervals corresponding to one or more of the data words such as, for example, data words associated with almanac data at which decoding of these one or more of the data words is not required. The GNSS enabled mobile device 110a may be operable to disable or defer the AFC correction during the time intervals associated with decoding of one or more of the words while the crystal oscillator may drift within a specific frequency error range based on the clock reference associated with the cellular radio signals. The AFC correction may be allowed by the GNSS enabled mobile device 110a during the time intervals corresponding to one or more of the words after the decoding of these one or more words are completed. In this regard, for example, after a GNSS time is decoded, the AFC correction may be allowed during the time intervals corresponding to the telemetry word and the handover word.

Figure 2:
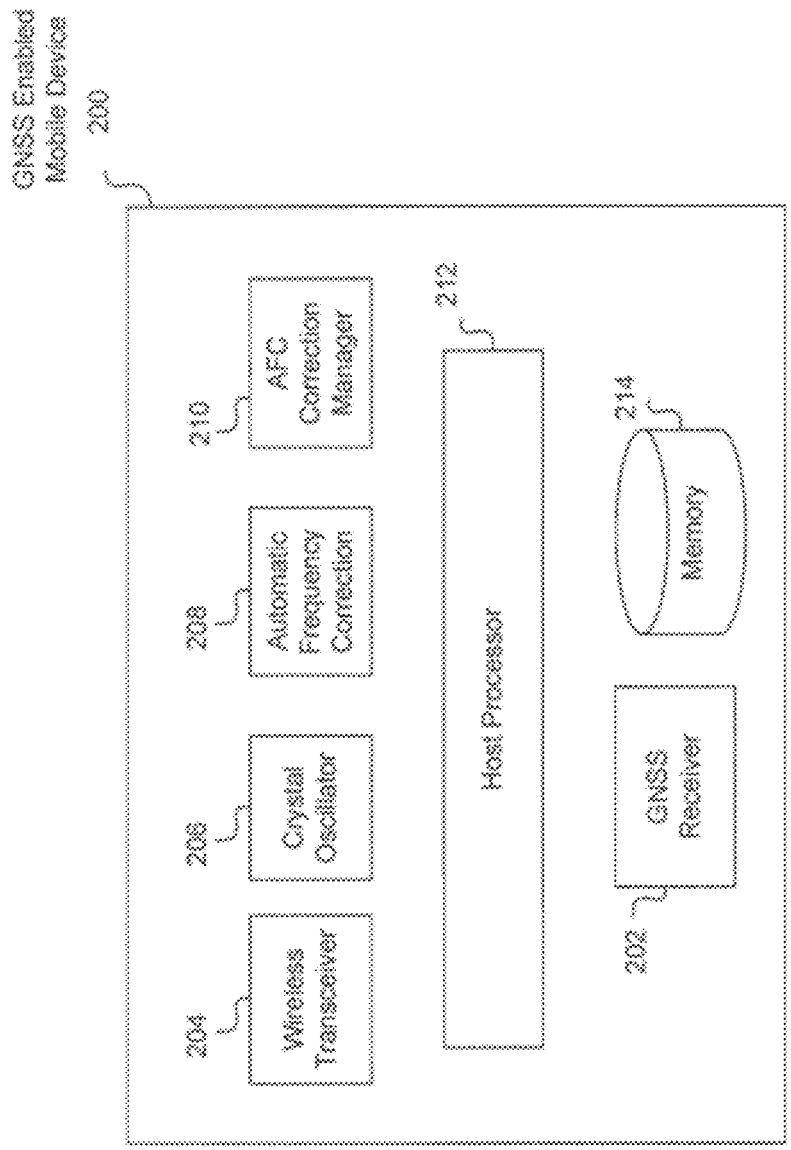
FIG. 2 is a block diagram illustrating an exemplary GNSS enabled mobile device that is operable to share an oscillator when processing cellular radio signals and GNSS radio data signals by deferring AFC corrections, in accordance with an embodiment of the invention.

FIG. 2 is a block diagram illustrating an exemplary GNSS enabled mobile device that is operable to share an oscillator when processing cellular radio signals and GNSS radio data signals by deferring AFC corrections, in accordance with an embodiment of the invention. Referring to FIG. 2, there is shown a GNSS enabled mobile device 200. The GNSS enabled mobile device 200 may comprise a GNSS receiver 202, a wireless transceiver 204, a crystal oscillator 206, an automatic frequency correction 208, an AFC correction manager 210, a host processor 212 and a memory 214.

The GNSS receiver 202 may comprise suitable logic, circuitry, interfaces and/or code that may be operable to detect and receive GNSS signals or data messages from a plurality of visible GNSS satellites 120a-120c. The GNSS receiver 202 may be operable to utilize the received GNSS signals or data messages to calculate navigation information such as a position fix and/or velocity of the GNSS receiver 202. The calculated navigation information may be provided to the host processor 212 to be communicated with the wireless communication network 130 for various navigation applications such as, for example, location-based 411.

The wireless transceiver 204 may comprise suitable logic, circuitry, interfaces and/or code that may be operable to communicate radio signals over the wireless communication network 130.

The crystal oscillator 206 may comprise suitable logic, circuitry, interfaces and/or code that may be operable to provide clock reference to the GNSS enabled mobile device 200. A frequency of the crystal oscillator 206 may be constantly adjusted or corrected to stay tuned to cellular base stations using the automatic frequency correction 208. The crystal oscillator 206 may be a digitally controlled crystal oscillator (DCXO) or a voltage controlled temperature compensated crystal oscillator (VCTCXO). In an exemplary embodiment of the invention, the crystal oscillator 206 may be shared between processing of cellular radio signals and processing of GNSS data messages.

The automatic frequency correction 208 may comprise suitable logic, circuitry, interfaces and/or code that may be operable to provide frequency adjustment and/or correction to the crystal oscillator 206. The automatic frequency correction 208 may comprise a bank of switched capacitors which may be controlled to change the frequency of the crystal oscillator 206.

The AFC correction manager 210 may comprise suitable logic, circuitry, interfaces and/or code that may be operable to control or manage an AFC correction or a frequency correction generated by the automatic frequency correction 208.

The AFC correction manager 210 may be operable to enforce an AFC correction generated by the automatic frequency correction 208 in instances when the crystal oscillator 206 drifts beyond a specific frequency error based on the clock reference associated with the cellular radio signals. The AFC correction generated by the automatic frequency correction 208 during the time intervals corresponding to one or more of the data words such as, for example, data words associated with almanac data at which decoding of these one or more of the data words is not required. The AFC correction generated by the automatic frequency correction 208 may be disabled or deferred by the AFC correction manager 210 during the time intervals associated with decoding of one or more of the words while the crystal oscillator 206 may drift within a specific frequency error range based on the clock reference. The AFC correction manager 210 may be operable to allow the AFC correction generated by the automatic frequency correction 208 during the time intervals corresponding to one or more of the words after the decoding of these one or more words are completed. In this regard, for example, after a GNSS time is decoded, the AFC correction may be allowed during the time intervals corresponding to the telemetry word and the handover word.

The host processor 212 may comprise suitable logic, circuitry, interfaces and/or code that may be operable to process signals from the GNSS receiver 202 and the wireless transceiver 204. The host processor 212 may be operable to communicate signals with the wireless communication network 130 via the wireless transceiver 204. The host processor 212 may be operable to communicate navigation information with the wireless communication network 130 for various navigation applications such as location-based 411 and/or roadside assistance.

The memory 214 may comprise suitable logic, circuitry, and/or code that operable to store information such as executable instructions and data that may be utilized by the host processor 212. The memory 214 may comprise RAM, ROM, low latency nonvolatile memory such as flash memory and/or other suitable electronic data storage.

In operation, the crystal oscillator 206 may be shared between processing of cellular radio signals and processing of GNSS data messages. The automatic frequency correction 208 may be operable to provide frequency adjustment and/or correction to the crystal oscillator 206. The AFC correction manager 210 may be operable to control or manage an AFC correction or a frequency correction generated by the automatic frequency correction 208. The AFC correction generated by the automatic frequency correction 208 may be enforced by the AFC correction manager 210 in instances when the crystal oscillator 206 drifts beyond a specific frequency error based on the clock reference associated with the cellular radio signals. The AFC correction generated by the automatic frequency correction 208 may be allowed by the AFC correction manager 210 during the time intervals corresponding to one or more of the data words such as, for example, data words associated with almanac data at which decoding of these one or more of the data words is not required. The AFC correction manager 210 may be operable to disable or defer the AFC correction generated by the automatic frequency correction 208 during the time intervals associated with decoding of one or more of the words while the crystal oscillator 206 may drift within a specific frequency error range based on the clock reference associated with the cellular radio signals. The AFC correction manager 210 may be operable to allow the AFC correction generated by the automatic frequency correction 208 during the time intervals corresponding to one or more of the words after the decoding of these one or more words are completed. In this regard, for example, after a GNSS time is decoded, the AFC correction may be allowed during the time intervals corresponding to the telemetry word and the handover word.

Figure 3:
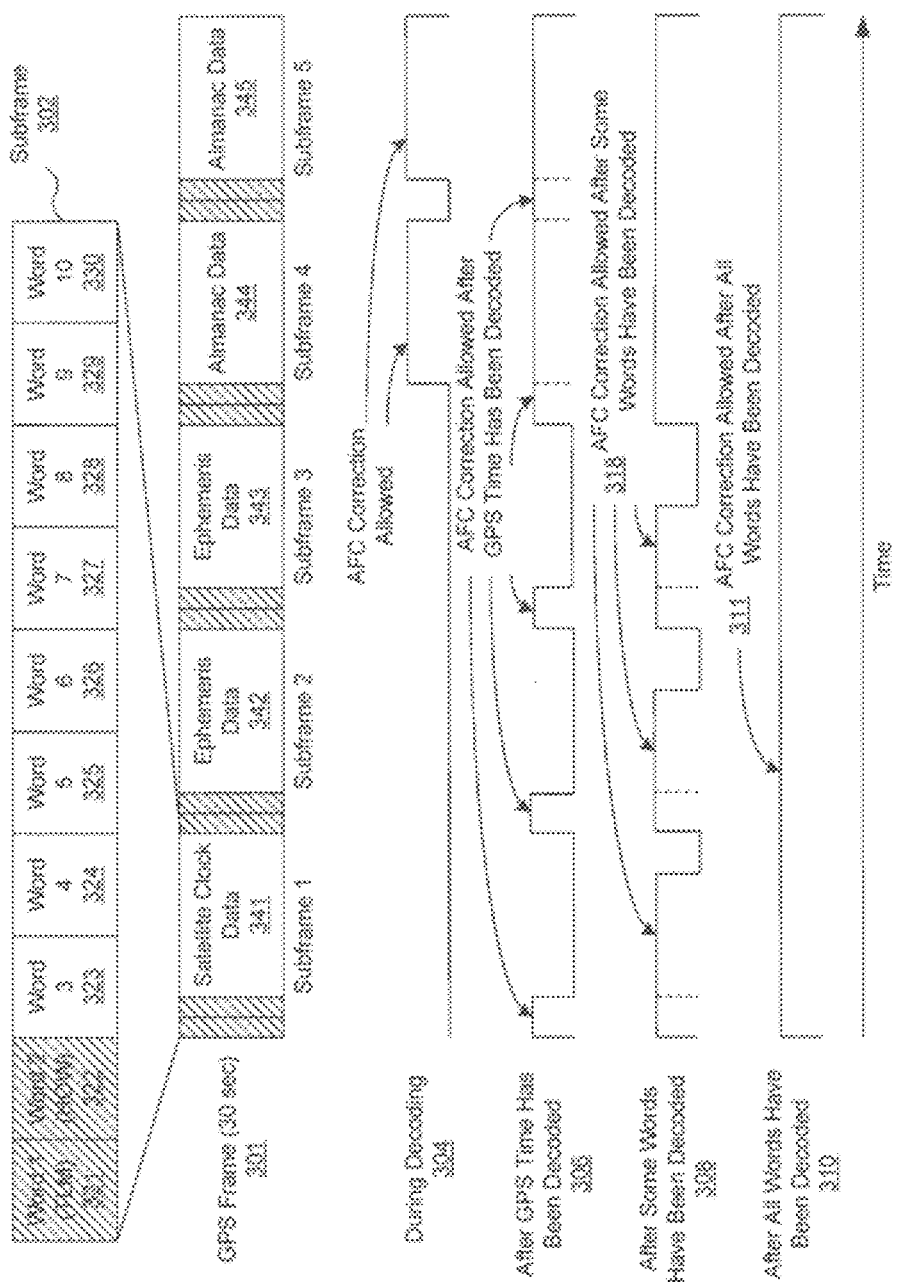
FIG. 3 is a block diagram illustrating an exemplary AFC correction timing diagram, in accordance with an embodiment of the invention.

FIG. 3 is a block diagram illustrating an exemplary AFC correction timing diagram, in accordance with an embodiment of the invention. Referring to FIG. 3, there is shown a GPS frame 301, a subframe 302, an AFC correction timing 304, an AFC correction timing 306, an AFC correction timing 308 and an AFC correction timing 310.

A GNSS frame such as a GPS frame 301 may comprise a plurality of subframes such as the subframe 302. Each of the subframes such as the subframe 302 may comprise a plurality of words such as word 1 through word 10 321-330. Among the word 1 through word 10 312-330, there is a telemetry word (TLM) such as the word 1 321, a handover word (HOW) such as the word 2 322 and a plurality of data words such as the word 3 through word 10 323-330. The plurality of data words are associated with satellite clock data 341, ephemeris data 342, 343 or almanac data 344, 345 as illustrated in the GPS frame 301.

The AFC correction timing 304 illustrates that during decoding, AFC corrections may be allowed only during time intervals corresponding to data words such as, for example, data words associated with almanac data 344, 345 at which decoding of these data words are not required. The AFC correction timing 306 illustrates that after GNSS time such as GPS time has been decoded, the telemetry words 321 and the handover words 322 are no longer required and AFC corrections may then be allowed during time intervals corresponding to the telemetry words 321 and the handover words 322. The AFC correction timing 308 illustrates that after some words 318 have been decoded, these words 318 are no longer required and AFC corrections may be allowed during time intervals corresponding to these words 318. The AFC correction timing 310 illustrates that after all words 311 have been decoded, AFC corrections may no longer be disabled or deferred. In this regard, the time windows for enabling or allowing AFC corrections may grow over time during the GNSS decoding process.

Figure 4:
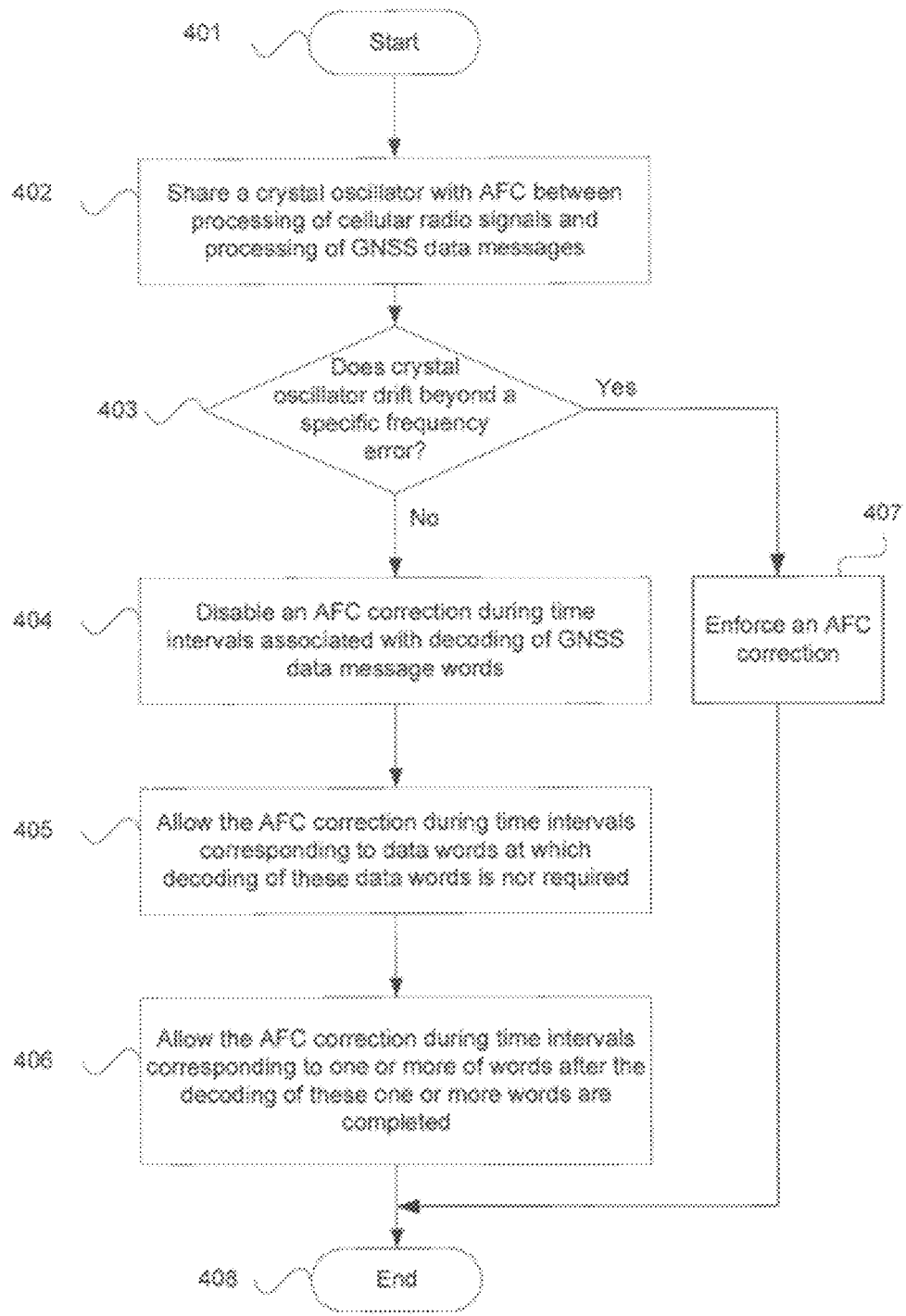
FIG. 4 is a flow chart illustrating exemplary steps for sharing of an oscillator when processing cellular radio signals and GNSS radio data signals by deferring AFC corrections, in accordance with an embodiment of the invention.

FIG. 4 is a flow chart illustrating exemplary steps for sharing of an oscillator when processing cellular radio signals and GNSS radio data signals by deferring AFC corrections, in accordance with an embodiment of the invention. Referring to FIG. 4, the exemplary steps start at step 401. In step 402, the GNSS enabled mobile device 200 may be operable to share a crystal oscillator with AFC between processing of cellular radio signals and processing of GNSS data messages. In step 403, a frequency error of the crystal oscillator is checked. In instances when the crystal oscillator drifts beyond a specific frequency error, the exemplary steps may proceed to step 407. In step 407, the AFC correction manager 210 may be operable to enforce an AFC correction. The exemplary steps may proceed to the end step 408. In step 403, in instances when the crystal oscillator drifts within the specific error range, the exemplary steps may proceed to step 404. In step 404, the AFC correction manager 210 may be operable to disable an AFC correction during time intervals associated with decoding of GNSS data message words. In step 405, the AFC correction manager 210 may be operable to allow the AFC correction during time intervals corresponding to data words at which decoding of these data words is not required. In step 406, the AFC correction manager 210 may be operable to allow the AFC correction during time intervals corresponding to one or more of words after the decoding of these one or more words are completed. The exemplary steps may proceed to the end step 408.

In various embodiments of the invention, a global navigation satellite system (GNSS) enabled mobile device 200 comprising a crystal oscillator 206 and an automatic frequency correction (AFC) 208 may be operable to share the crystal oscillator 206 between processing of cellular radio signals and processing of GNSS data messages. A plurality of time intervals within a time period corresponding to a frame 301 of the GNSS data message for an AFC correction may be determined. The GNSS enabled mobile device 200 may be operable to control the AFC correction based on the determined time intervals and a clock reference associated with the cellular radio signals. In this regard, the AFC correction manager 210 may be operable to enforce the AFC correction in instances when the crystal oscillator 206 drifts beyond a specific frequency error based on the clock reference.

A frame 301 of the GNSS data message may comprise a plurality of subframes 302, and each of the subframes 302 may comprise a plurality of words 321-330, and the plurality of words may comprise a telemetry word 321, a handover word 322 and a plurality of data words 323-330. In this regard, the AFC correction manager 210 may be operable to allow the AFC correction during the time intervals corresponding to one or more of the data words such as, for example, data words associated with almanac data 344, 345 at which decoding of these one or more of the data words is not required. The AFC correction may be disabled by the AFC correction manager 210 during the time intervals associated with decoding of one or more of the words while the crystal oscillator 206 may drift within a specific frequency error range based on the clock reference associated with the cellular radio signals. The AFC correction manager 210 may be operable to allow the AFC correction during the time intervals corresponding to one or more of the words after the decoding of these one or more words 318 are completed. In this regard, for example, after a GNSS time is decoded, the AFC correction may be allowed during the time intervals corresponding to the telemetry word 321 and the handover word 322.

The GNSS data messages may be received from one of global positioning system (GPS) satellites 120 or from one of global orbiting navigation satellite system (GLONASS) satellites 120.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for sharing an oscillator for processing cellular radio signals and GNSS radio data signals by deferring AFC corrections.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A global navigation satellite system (GNSS) enabled mobile device, comprising:
   a wireless transceiver configured to process a cellular radio signal;
   a GNSS receiver configured to process a GNSS data message;
   a crystal oscillator shared between said wireless transceiver and said GNSS receiver; and
   an automatic frequency correction (AFC) manager configured:

to determine time intervals within a time period corresponding to a frame of said GNSS data message for AFC, and to control said AFC based on said determined time intervals and a clock reference associated with said cellular radio signal.

2. The GNSS enabled mobile device according to claim 1, wherein said AFC manager is further configured to enforce said AFC when said crystal oscillator drifts beyond a specific frequency error range.

3. The GNSS enabled mobile device according to claim 1, wherein said frame of said GNSS data message comprises a plurality of subframes, and each of said plurality of subframes comprises a plurality of words, and said plurality of words comprise a telemetry word, a handover word and a plurality of data words.

4. The GNSS enabled mobile device according to claim 3, wherein said AFC manager is configured to allow said AFC during said time intervals when decoding of one or more of said plurality of data words is not required to control said AFC.

5. The GNSS enabled mobile device according to claim 3, wherein said AFC manager is configured to allow said AFC during said time intervals when said plurality of data words are associated with almanac data.

6. The GNSS enabled mobile device according to claim 3, wherein said AFC manager is configured to disable said AFC during said time intervals associated with decoding of one or more of said plurality of words while said crystal oscillator drifts within a specific frequency error range to control said AFC.

7. The GNSS enabled mobile device according to claim 6, wherein said AFC correction manager is configured to allow said AFC during said time intervals that occur after completion of said decoding of said one or more of said plurality of words to control said AFC.

8. The GNSS enabled mobile device according to claim 7, wherein said AFC manager is configured to allow said AFC during said time intervals corresponding to said telemetry word and said handover word after a GNSS time is decoded to control said AFC.

9. The GNSS enabled mobile device according to claim 1, wherein said GNSS receiver is further configured to receive said GNSS data message from a global positioning system (GPS) satellite.

10. The GNSS enabled mobile device according to claim 1, wherein said GNSS receiver is further configured to receive said GNSS data message from a global orbiting navigation satellite system (GLONASS) satellite.

11. A global navigation satellite system (GNSS) enabled mobile device, comprising:
a wireless transceiver configured to process a cellular radio signal using a clock reference derived from a crystal oscillator;
a GNSS receiver configured to process a GNSS data message using a second clock reference derived from said crystal oscillator;
an automatic frequency correction (AFC) block configured to adjust a frequency of said crystal oscillator; and
an AFC manager configured to direct said AFC block to adjust said frequency of said crystal oscillator during a time interval within a time period corresponding to a portion of said GNSS data message that occurs after completion of decoding of said portion of said GNSS data message.

12. The GNSS enabled mobile device according to claim 11, wherein said crystal oscillator comprises:
a digitally controlled crystal oscillator (DCXO); or
a voltage controlled temperature compensated crystal oscillator.

13. The GNSS enabled mobile device according to claim 11, wherein said AFC block comprises:
a bank of switched capacitors configured to be controlled by said AFC manager to adjust said frequency of said crystal oscillator.

14. The GNSS enabled mobile device according to claim 11, wherein said portion of said GNSS data message comprises:
a data word associated with almanac data.

15. The GNSS enabled mobile device according to claim 11, wherein said AFC manager is further configured to disable said AFC block during a second time interval associated with decoding of said portion of said GNSS data message while said crystal oscillator drifts within a specific frequency error range.

16. The GNSS enabled mobile device according to claim 11, wherein said AFC manager is further configured to direct said AFC block to adjust said frequency of said crystal oscillator when said crystal oscillator drifts beyond a specific frequency error range.

17. The GNSS enabled mobile device according to claim 16, wherein said specific frequency error range is based on said clock reference.

18. The GNSS enabled mobile device according to claim 11, further comprising:
a host processor configured to process signals from said wireless transceiver and said GNSS receiver.

19. A global navigation satellite system (GNSS) enabled mobile device, comprising:
a wireless transceiver configured to process a cellular radio signal using a clock reference derived from a crystal oscillator;
a GNSS receiver configured to process a GNSS data message using a second clock reference derived from said crystal oscillator;
an automatic frequency correction (AFC) block configured to adjust a frequency of said crystal oscillator; and
an AFC manager configured to direct said AFC block to adjust said frequency of said crystal oscillator during a time interval within a time period corresponding to a portion of said GNSS data message that is not required to be decoded by said GNSS receiver.

20. The GNSS enabled mobile device according to claim 19, wherein said portion of said GNSS data message comprises:
a telemetry word; or
a handover word.

* * * * *